Feb. 24, 1931.　　　S. B. McHENRY　　　1,793,743
TIDEWATER POWER PLANT
Filed May 21, 1927　　　3 Sheets-Sheet 1

Samuel B. McHenry
INVENTOR

BY Victor J. Evans
ATTORNEY

WITNESS:

Feb. 24, 1931.   S. B. McHENRY   1,793,743
TIDEWATER POWER PLANT
Filed May 21, 1927   3 Sheets-Sheet 2

Samuel B. McHenry
INVENTOR

BY Victor J. Evans
ATTORNEY

WITNESS: John Donovan

Feb. 24, 1931.   S. B. McHENRY   1,793,743
TIDEWATER POWER PLANT
Filed May 21, 1927   3 Sheets-Sheet 3

Samuel B. McHenry
INVENTOR

BY Victor J. Evans
ATTORNEY

WITNESS

Patented Feb. 24, 1931

1,793,743

UNITED STATES PATENT OFFICE

SAMUEL B. McHENRY, OF BLOOMSBURG, PENNSYLVANIA

TIDEWATER POWER PLANT

Application filed May 21, 1927. Serial No. 193,203.

My present invention has reference to a tide water power apparatus designed to be operated on both the flow and ebb tides of a flowing body of water.

A further object is the provision of a tide water power plant in which floats are utilized to arrange a water wheel in the path of contact with a flowing body of water so that the blades of the said wheel will be engaged by the water to revolve the wheel during the rise and fall of such body of water, and wherein the wheel is connected with a generator for generating electric current or with means for driving apparatus.

A further object is the provision of a tide water power plant that may be successfully employed in connection with either turbulent or comparatively quiet bodies of flowing water, and wherein means comprising floats properly arrange the blades of the power or water wheel so that the same may be positioned for contact by such bodies during changes of tide.

A still further and important object of the invention is to arrange a basin, in the nature of a break water adjacent to a turbulent body of water, such for instance as an ocean so that the water flowing into the basin will be calmed in its passage thereinto and act upon the blades of a power or water wheel that is supported between floats arranged in the basin, and further wherein the water or power wheel is hitched to an electric generator or other apparatus to be operated by the wheel so that the generator or the like will have its shaft turned in the same direction upon the flow tide when the water is directed into the basin from the ocean, and upon the ebb tide when the water flows backwardly through the basin into the ocean.

A still further object is the provision of a tide water power plant in which water from a turbulent body, such as an ocean or the like is directed into and calmed in its flow through a basin, said basin having arranged therein a sluice way for the flowing water, the basin having arranged therein spaced floats whose tops are connected by a frame and which frame has journaled thereon, between the floats a water wheel that is positioned in the sluice way, together with means in the nature of a plate or abutment which is carried by the frame, guided in the sluice way and has an upper lateral extension or head disposed just out of contact with the blades of the wheel so that the water flowing into and out of the sluice way will have its full force directed against the lower blades of the wheel to positively insure the free turning of the wheel in both the flow, ebb tide and intermediate tides between such flow and edd tide.

A still further object is the provision of a tide water power plant that is anchored in a body of flowing water so that the water or power wheel of the plant will be properly arranged in the water to receive the full force of the flow thereof, in which floats support the wheel, and in which a shaft operated by the wheel is caused to move in the same direction even when the wheel is turned in opposite directions by the ebb and flow tides of the body of water.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

Figure 1:
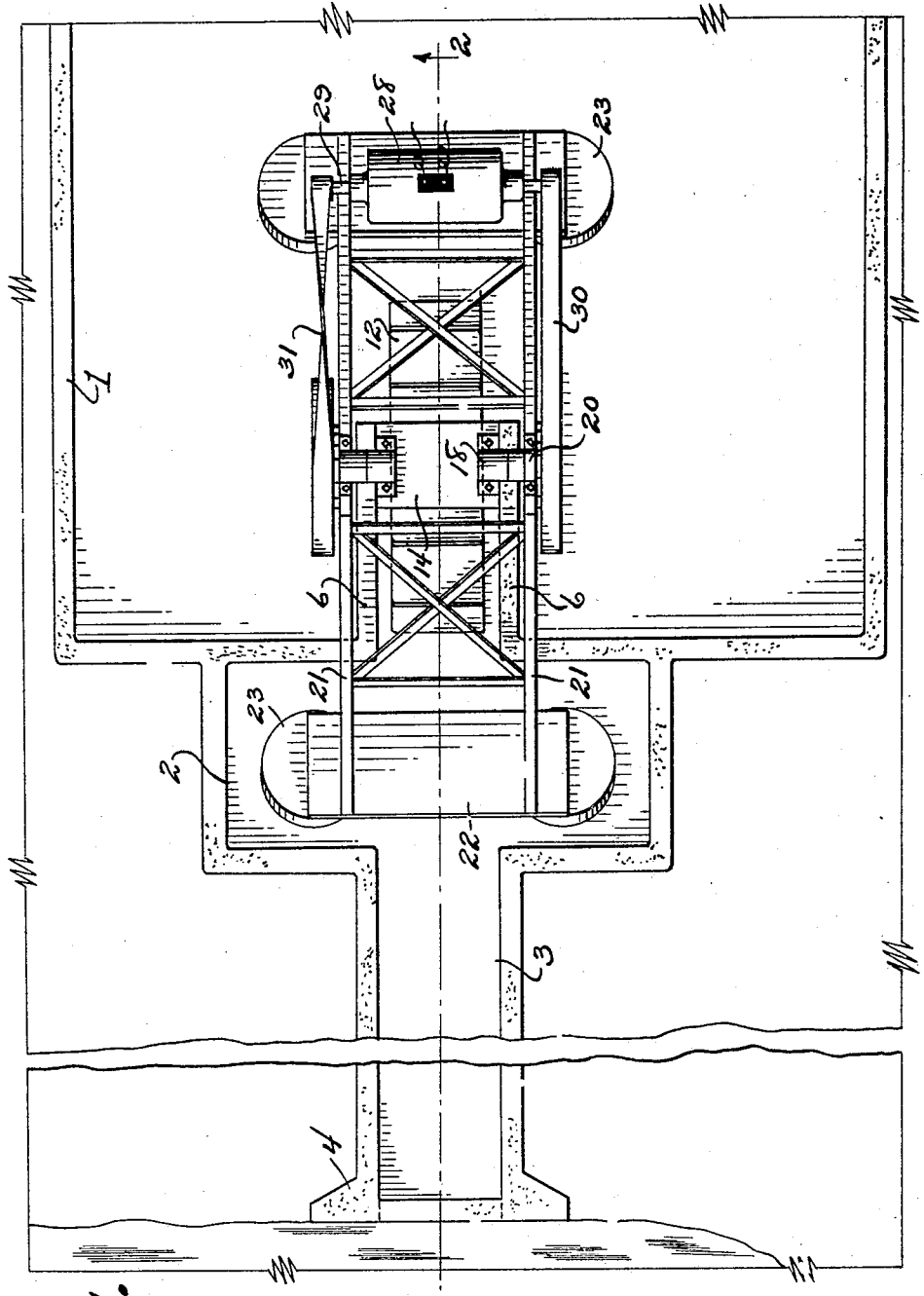
Figure 1 is a top plan view of one embodiment of my invention.
Figure 2:
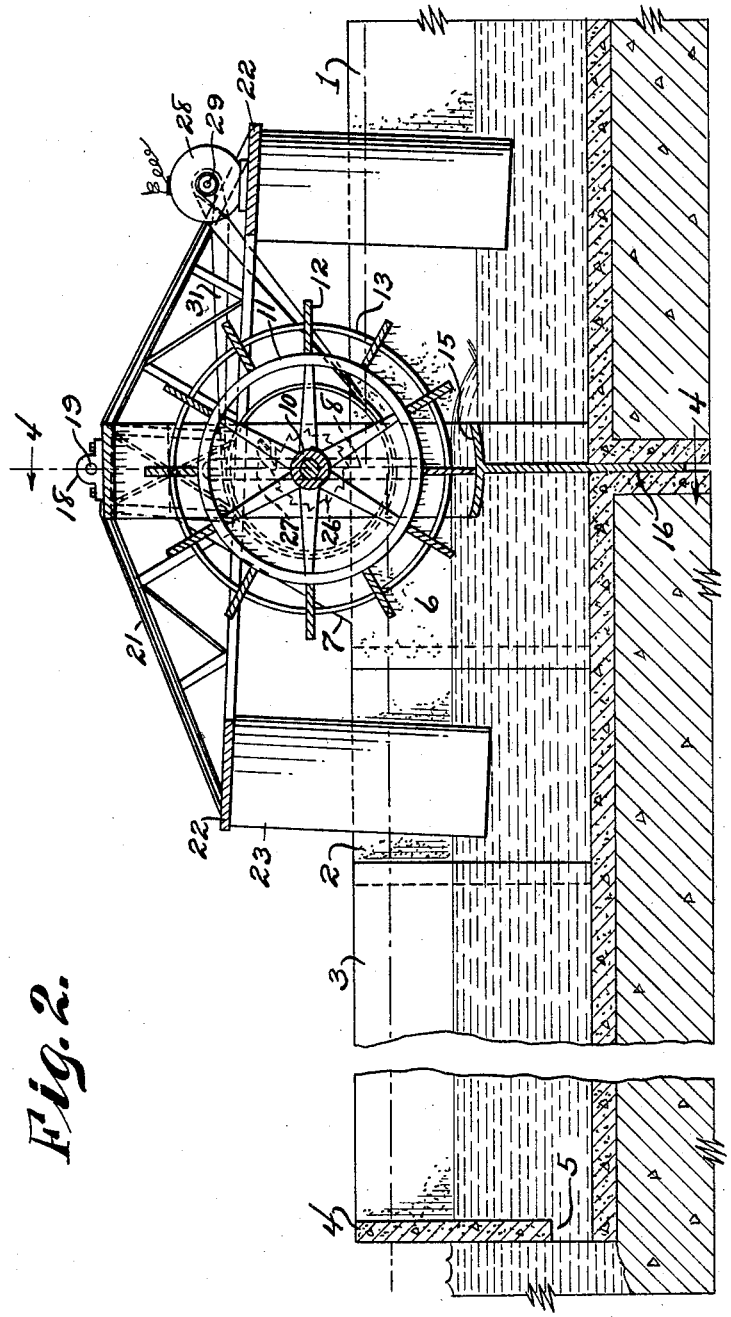
Figure 2 is a sectional view on the line 2—2 of Figure 1.
Figure 3:
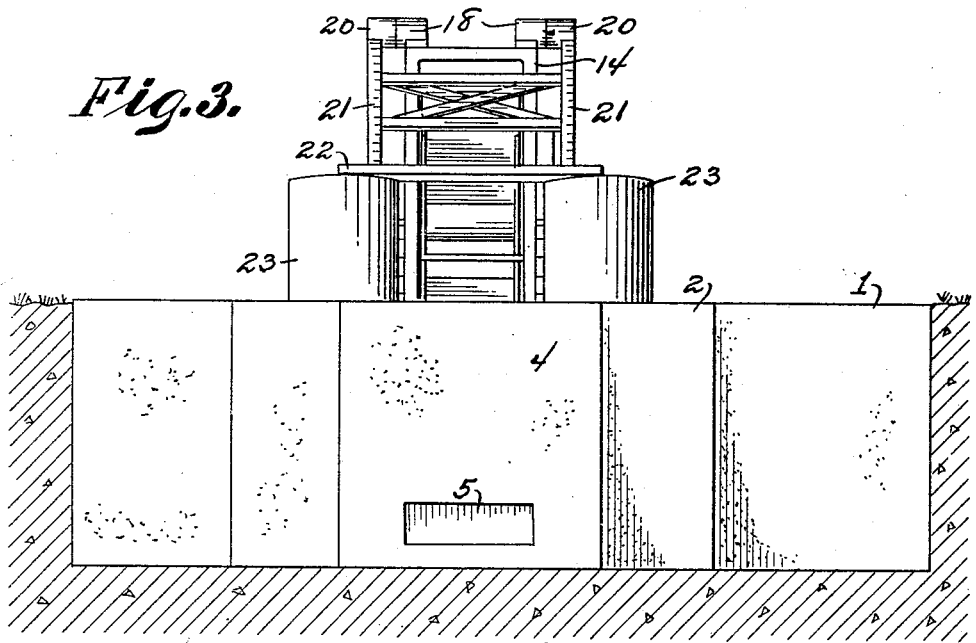
Figure 3 is a view looking toward the front of the basin.
Figure 4:
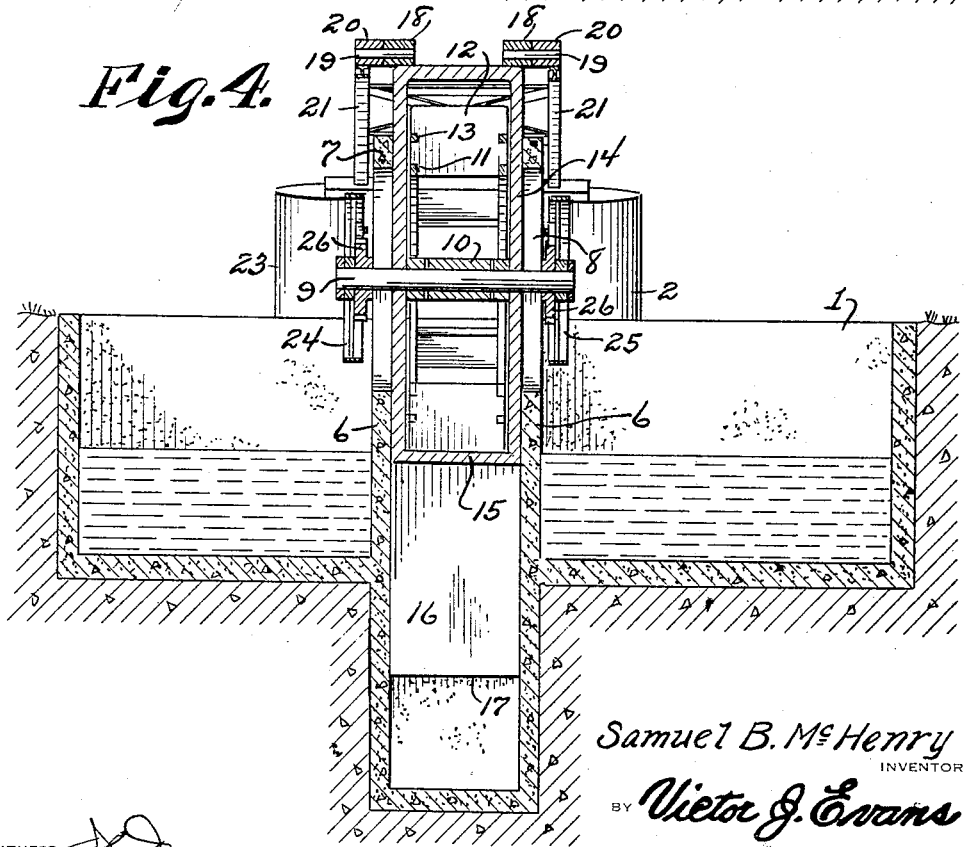
Figure 4 is a sectional view on the line 4—4 of Figure 2.

In the showing of the drawings I have illustrated my improved tide water power plant positioned to be operated by the tide of a turbulent body of water, such as an ocean, but, as the description progresses it will be apparent that the plant may be actuated by the tides of a comparatively calm body of water, such as a river or the like.

In the showing of the drawings I construct a basin 1. The basin is preferably formed of concrete and is, of course, of a desired depth, length and width. At what I will term the front of the basin I form a chamber 2 having a central extension in the nature of a water conduit 3. The outer wall 4 of the conduit provides a break water for a large body of water, such as an ocean. For this reason the outer wall 4 is suitably reinforced, the same being provided, adjacent to or at the bottom thereof with a rather restricted water entrance passage 5.

The front wall of the basin, to which the portion 2, which I have termed a chamber is connected has a central opening therethrough disposed in a line with the opening in the front wall of the chamber from which the conduit 3 extends, and in a line with the said opening in the basin I build longitudinally extending walls 6 that establish therebetween a sluice way. The sluice way is extended into the basin and may be of any desire length. In this connection it may be well to state that the basin, chamber, conduit and sluice way are all of the same height, but the walls 6 providing the sluice way have opposite projecting portions 7 formed with vertically extending alining slots 8 that also enter the walls 6.

Guided through the elongated slots 8 there is the shaft 9 for the water or power wheel. In the showing of the drawings the hub 10 of the water wheel, fixed on the shaft 9, has radiating arms to which are connected a rim 11 on which are secured and from which radiate the blades 12, and connecting and reinforcing these blades are ring members 13. The shaft 9 passes through bearing openings in the central and substantially rectangular member 14 of a frame. The parallel sides of the member 14 are held slightly out of contact with the sides of the power wheel by the hub 10, and the lower transverse portion of the substantially rectangular frame member 14 is slightly dished and is indicated, for distinction by the numeral 15. The inner wall of this member 15 is disposed just slightly out of contact with the blades 12 of the water wheel. Preferably integrally formed on the wall or member 15, and depending therefrom there is a plate 16 whose edges may be received in guide slots in the side walls 6 of the sluice way, and whose lower portion is received in a guide passage 17 that enters the bottom of the sluice way. The passage 17 is preferably provided by a pair of spaced walls arranged transversely of and depending from the bottom wall of the sluice way and basin. The plate 16 provides a dam or barrier for the tide water passing through the sluice-way in either direction and positively causes the water to flow over the dished or basin portion 15 of the frame so that such water will be brought into direct contact with the lower blades of the water wheel hereinafter to be described, to turn such wheel either upon the flow or ebb tide and regardless of the level of water in the sluice-way.

The top of the rectangular frame member 14 has centrally fixed thereon spaced bearings 18 for stub shafts 19 that are received in similar bearings 20 on the central portion of truss frames 21. The outer and lower ends of the swingable truss members are connected by plates 22 to whose under faces there are secured the top portions of floats 23. Of course, any desired number of floats may be provided and any suitable type of floats may be employed. In the showing of the drawings the floats are in the nature of closed cylinders, and two of such floats are secured on each plate 22.

Freely journaled on but held from longitudinal movement on the ends of the shaft 9 there are belt wheels 24 and 25, respectively. Keyed or otherwise fixed on the shaft 9 and disposed adjacent to the inner faces of the belt wheels 24 and 25 there are ratchet wheels 26, respectively. The teeth of the respective wheels 26 are oppositely arranged and are engaged by dogs or pawls 27 on the inner faces of said wheels 24 and 25. Thus when the shaft is turned by the water wheels in either of two directions, one of the belt wheels will revolve with the shaft, while the turning shaft ratchets over the second belt wheel.

The improvement may be employed for imparting power to any shaft or like revoluble element, but in the showing of the drawings the improvement is disclosed as a means for generating electricity. One one of the plates 22 I fix a generator 28 whose shaft 29 has fixed on its ends suitable pulley wheels. Trained around these pulley wheels and the belt wheels 24 and 25, respectively there is a straight belt 30 and a crossed belt 31. By this arrangement it will be seen that the generator shaft 29 will be turned in the same direction when the water wheel is turned in one direction by the flow tide flowing through the basin and by the ebb tide flowing in a reverse direction through the basin back into the ocean or other large body of water.

With my improvement it will be seen that I calm a turbulent body of water and positively direct the same to operate upon the lower blades of the water wheel in its passage through the basin. The floats 23 hold the blades of the water wheel in a position to be properly contacted by the flowing water, regardless of tide changes. The water wheel is positively acted on by the water during ebb as well as flow tides. The device is comparatively simple, but is of such construction as to insure strength and durability so that after installation few, if any repairs will be required thereto.

Having described the invention, I claim:—

1. A tide water power plant comprising a basin, a chamber located at one end of the basin, spaced side walls extending from opposite sides of the chamber to cooperate with the latter in forming a sluice having receiving and discharge ends and said discharge end located in the basin, a wall closing the receiving end of the sluice and having a restricted entrance to regulate the flow of water through the sluice, a frame slidable in the sluice, a water wheel journaled in the frame, a float frame pivoted to the first frame and extending parallel with the sluice with one end disposed over the basin and the other end disposed over the chamber, and floats connected to the ends of the float frame and engaging the water in the chamber and basin.

2. A tide water power plant comprising a basin, a chamber located at one end of the basin, spaced side walls extending from opposite sides of the chamber to cooperate with the latter in forming a sluice having receiving and discharge ends, and said discharge ends located in the basin, a wall closing the receiving end of the sluice and having a restricted entrance to regulate the flow of water through the sluice, a rectangular frame mounted for vertical sliding movement in the sluice, a water wheel journaled in the frame, said frame having an arcuate shaped lower wall to direct the water against the wheel, a plate carried by the lower end of the frame to retard the water through the sluice and cause the major portion of the water to pass through the frame and over the lower wall thereof, a float frame pivoted to the first frame and extending parallel with the sluice with one end disposed over the basin and the other end disposed over the chamber, and floats connected to the ends of the float frame and engaging the water in the chamber and basin.

In testimony whereof I affix my signature.

SAMUEL B. McHENRY.